United States Patent [19]
Sheplak et al.

[11] Patent Number: 6,018,861
[45] Date of Patent: Feb. 1, 2000

[54] METHOD OF FORMING MICRO-SENSOR THIN-FILM ANEMOMETER

[75] Inventors: Mark Sheplak, Keystone Heights, Fla.; Catherine B. McGinley, Newport News, Va.; Eric F. Spina, Syracuse, N.Y.; Ralph M. Stephens, Norfolk, Va.; Purnell Hopson, Jr., Seaford, Va.; Vincent B. Cruz, Hayes, Va.

[73] Assignee: The United States of America as represented by the United States National Aeronautics and Space Administration, Washington, D.C.

[21] Appl. No.: 08/698,559

[22] Filed: Aug. 15, 1996

Related U.S. Application Data

[62] Division of application No. 08/361,601, Nov. 21, 1994, Pat. No. 5,576,488.

[51] Int. Cl.[7] .................................................. G01R 3/00
[52] U.S. Cl. .................................................. 29/595; 29/825
[58] Field of Search ................................ 29/825, 592.1, 29/595; 73/204.26

[56] References Cited

U.S. PATENT DOCUMENTS

| | | | |
|---|---|---|---|
| 4,024,761 | 5/1977 | Djorup | 73/204.26 |
| 4,345,465 | 8/1982 | Gruner et al. | 73/204.26 |
| 4,448,070 | 5/1984 | Ohyama et al. | 73/204.26 |
| 4,616,506 | 10/1986 | Sumal | 73/204.26 |
| 4,829,819 | 5/1989 | Lefteriou et al. | 73/204.26 |
| 4,872,945 | 10/1989 | Myers et al. | 29/595 X |
| 5,218,865 | 6/1993 | Djorup | 73/204.26 |
| 5,307,677 | 5/1994 | Beyrich et al. | 73/204.26 |
| 5,361,634 | 11/1994 | Uramachi | 73/204.26 |
| 5,423,213 | 6/1995 | Yajima | 73/204.26 |

OTHER PUBLICATIONS

S.C. Ling et al. The Hot–Film Anemometer: A New Device for Fluid Mechanics Research, J. Aeribayt. Sci., pp. 890–891, Sep. 1956.

G. W. Lowery et al, The Effect of Turbulence on Heat Transfer From Heat Cylinders, Int *J. Heat Nass Transfer,* pp. 2003–2005, Nov. 1990.

A. Demetriades et al., "Characteristics of Hot Film Anemometers for Use in Hypersonic Flows", *Technical Notes,* pp. 2003–2005, Nov. 1990.

J. M. Seiner, The Wedge Hot–Film Anemometer in Supersonic Flow, NASA' TP 2134, 55 pages, 1983.

*Primary Examiner*—Carl J. Arbes
*Attorney, Agent, or Firm*—Linda B.B. Blackburn

[57] ABSTRACT

A device for measuring turbulence in high-speed flows is provided which includes a micro-sensor thin-film probe. The probe is formed from a single crystal of aluminum oxide having a 14° half-wedge shaped portion. The tip of the half-wedge is rounded and has a thin-film sensor attached along the stagnation line. The bottom surface of the half-wedge is tilted upward to relieve shock induced disturbances created by the curved tip of the half-wedge. The sensor is applied using a microphotolithography technique.

6 Claims, 3 Drawing Sheets

METHOD OF FORMING MICRO-SENSOR THIN-FILM ANEMOMETER

This is a divisional of application Ser. No. 08/361,601 filed on Nov. 21, 1994, U.S. Pat. No. 5,576,488.

ORIGIN OF THE INVENTION

The invention described herein was made jointly in the performance of work under NASA Grant No. NAG-1-1400 with Syracuse University and a graduate student, and employees of the United States Government. In accordance with 35 U.S.C. 202, the grantee elected not to retain title.

BACKGROUND OF THE INVENTION

1. Field of the Invention

The present invention relates generally to a device and method for measuring turbulence in high-speed flows, and more particularly to a microsensor thin-film probe capable of measuring turbulence in hypersonic flows.

2. Description of the Related Art

Turbulence measurements in high-speed flows have historically been obtained by hot-wire anemometry. However, high stagnation temperatures, high dynamic pressures, and flow contaminants severely limit the life of hot-wire elements in hypersonic flow. Nonintrusive measurement techniques such as laser-Doppler velocimetry and particle-image velocimetry also are limited when applied to hypersonic flow. In particular, data-rate limitations and difficulties in flow seeding present the most significant obstacles to their accurate application in high-speed flows. An alternative to conventional hot-wire anemometry is hot-film anemometry, with a thin metallic film deposited along the stagnation line of a rigid, dielectric substrate, thus increasing mechanical strength.

Hot-film probes incorporating various combinations of materials and construction techniques have displayed excellent durability and moderate frequency response characteristics in the few high-speed and high temperature flows in which they have been tested.

Ling and Hubbard introduced the thin-film probe as a resistance-temperature transducer to measure turbulent fluctuations in flowfields in which hot-wires could not survive (Ling, S. C. and Hubbard, P. G. 1956 "The Hot-Film Anemometer: A New Device for Fluid Mechanics Research", *J. Aeronaut. Sci.* 23, 890). This probe consisted of a thin layer of platinum fused to a glass substrate. The main body of the probe consisted of a 4.0 mm diameter Pyrex rod with two 32-gauge platinum lead wires (2.0 mm apart) embedded within the core. The rod was ground down into a 8° wedge, tipped by a 30° wedge. Fused on the wedge tip was a thin platinum film sensor (1.0 mm×0.2 mm) with a nominal cold resistance of 20Ω. The ends of the sensor were attached to the exposed lead wires by thick platinum overplatings. It was tested at high temperatures (1100° F.) without detectable changes in thermoelectric properties. Experiments indicated a frequency response of 100 kHz at a flow velocity of 1000 ft/sec.

Later, Seiner used commercial hot-film probes to investigate high-speed, cold jet flows (Mach 0.5–2.0), (Seiner, J. M. 1983 "The Wedge Hot-Film Anemometer in Supersonic Flow", NASA Technical Paper 2134). The probe consisted of a thin film of nickel sputtered on a 4° semivetrex wedge of quartz substrate. A protective coating of quartz (0.5–2.0 μm) was sputtered over the nickel (1.0 mm×0.2 mm) for electrical isolation and protection from particles. A maximum frequency response of 130 kHz for the 1:1 balanced CTA bridge was realized via the square-wave injection test, and was found to be inversely proportional to the thickness of the protective coating.

More recently, Demetriades and Anders presented a report on the ongoing development of a constant-current probe for use in high-temperature/hypervelocity flows (Demetriades, A. and Anders, S. G. 1990 "Characteristics of Hot-Film Anemometers for Use in Hypersonic Flows", AIAA Journal 28, 2003). The design consists of a platinum sensor (0.5 mm×1.8 mm) painted along the stagnation line of a wedge-shaped glaze bead positioned at the tip of a twin-bore alumina tube (10.0 cm×0.25 cm). Results from temperature endurance testing (temperature cycling to 1400° F.) demonstrated the excellent electrical stability characteristics of the probe. These probes were also run for hours in high-temperature, high dynamic-pressure environments (Mach 8.0, 800° F. and 20.7 kPa) without failure, further confirming the durability characteristics. Presently, there is no experimental data available from Demetriades documenting the frequency response characteristics of this probe. However, painted sensors contain cross-sectional non-uniformities which lead to "hot-spots" and sensor failures. In addition, the large sensor surface area used by Seiner and Demetriades limits the spatial resolution of the measurement technique.

The frequency response characteristics of the existing hot-film probes are inadequate to resolve the full turbulent spectrum for hypersonic flows. The "dual swept-surface" wedge designs used by Seiner are a poor approximation of stagnation-line heat-transfer, since the sensor extends 0.1 mm away from the tip on both sides of the wedge. In addition to this fundamental problem, Seiner found that the probe displayed poor directional behavior and was Mach-number sensitive. Seiner hypothesized that these problems were associated with the 40° wedge geometry and recommended examination of a larger semi-vertex angle or a wedge fitted with a rounded nose. Finally, this design is unacceptable for measurements in wallbounded shear flows, as shocks emanating from the bottom of the probe would disturb the flow.

SUMMARY OF THE INVENTION

It is a primary object of the present invention to provide a device and method for measuring turbulence in high-speed flows such as hypersonic flows.

A further object of the present invention is to measure turbulence in high-speed flows with a device and method having fast response and durability in the severe environment of hypersonic airflows.

The foregoing objects are achieved by providing an anemometer having a micro-sensor thin-film probe. The probe is a half-wedge formed from a single crystal of aluminum oxide (i.e., sapphire) and is configured to prevent the wedge from generating a detached shock through much of a hypersonic boundary layer. The tip of the sapphire probe is rounded to minimize flow disturbance and contains an iridium sensor formed on the rounded tip of the probe along the stagnation line.

The iridium sensor is formed by first depositing a layer of copper over the sapphire substrate in the area where the sensor is to be located. A layer of photoresist is then deposited over the copper and dried. A contact print of the sensor shape is then made into the photoresist by exposing the photoresist to ultraviolet light. The photoresist is then developed leaving an opening to the copper layer corresponding to the sensor shape. The exposed copper is etched to produce an opening through the copper to the sapphire substrate corresponding to the sensor shape. The photoresist is removed and niobium is deposited on the exposed sapphire substrate by electron beam vapor deposition. Without breaking the vacuum, iridium is deposited by electron beam vapor deposition onto the niobium layer. The copper is then removed with an etchant and the probe containing the sensor is annealed in a hard vacuum at approximately 1000° C. to stabilize the resistance of the sensor. Once the sensors are formed, they are connected to leads which connect to a coaxial cable. The coaxial cable connects to the driving circuit of the anemometer.

Sensors formed according to this method show a significant improvement in frequency response due to the lower thermal inertia of the sensor compared to conventional 5.0 μm diameter hot wire and existing hot films.

DESCRIPTION OF THE PREFERRED EMBODIMENTS

Figure 1A:
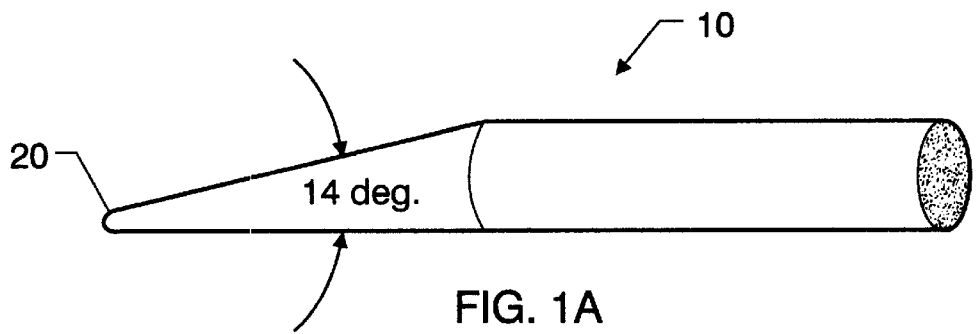
FIG. 1A is a side view of the thin-film probe of the present invention.
Figure 1B:
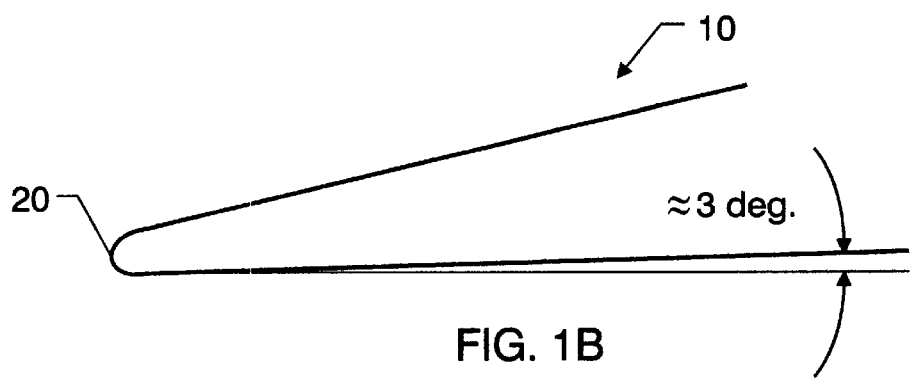
FIG. 1B is a side view of the tip of the thin-film probe depicted in FIG. 1A.
Figure 1C:
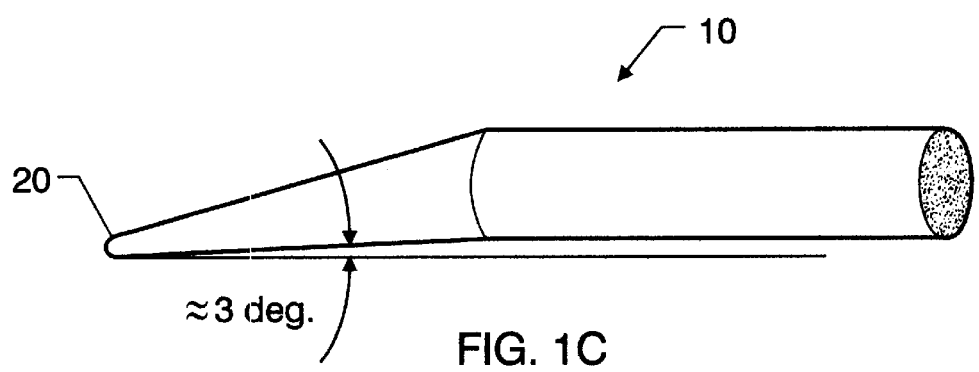
FIG. 1C is an illustration of the angle of a portion of the probe depicted in FIGS. 1A and 1B.
Figure 2:
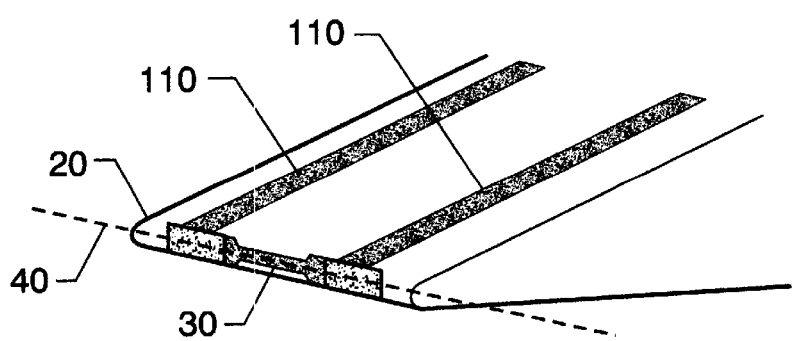
FIG. 2 is a drawing of the sensor region of the thin-film probe of the present invention.
Figure 3A:
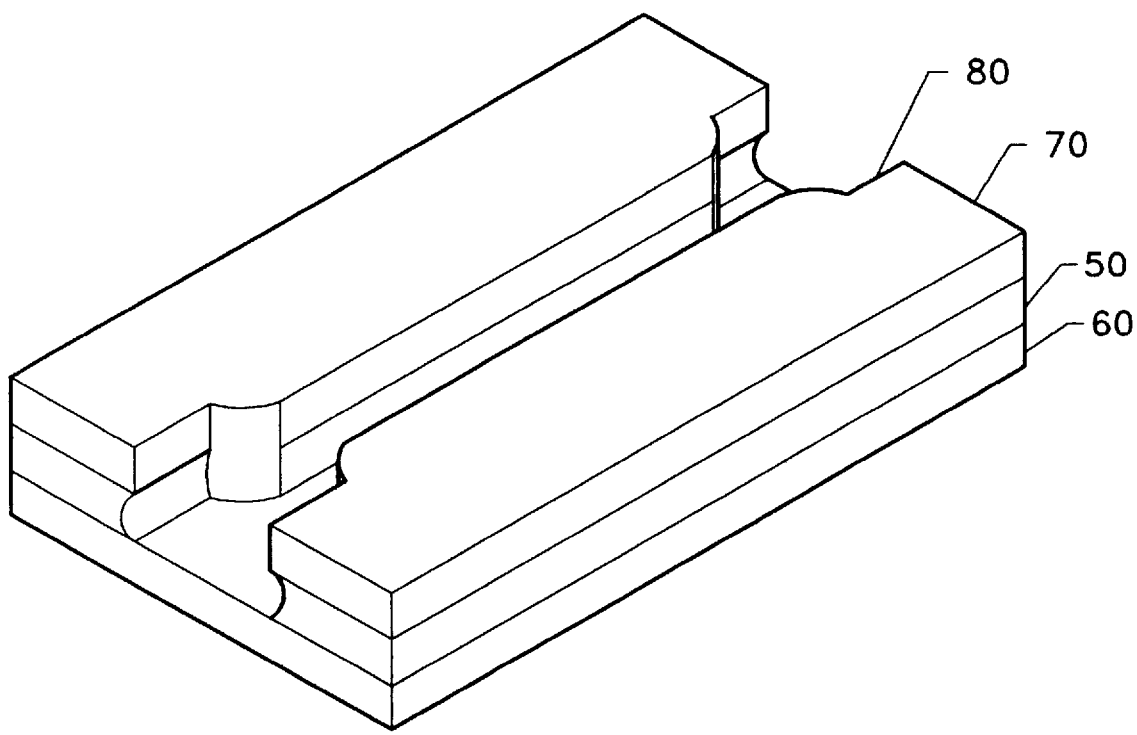
FIG. 3A is a drawing of the sensor pattern formed through the photoresist and copper layers.
Figure 3B:
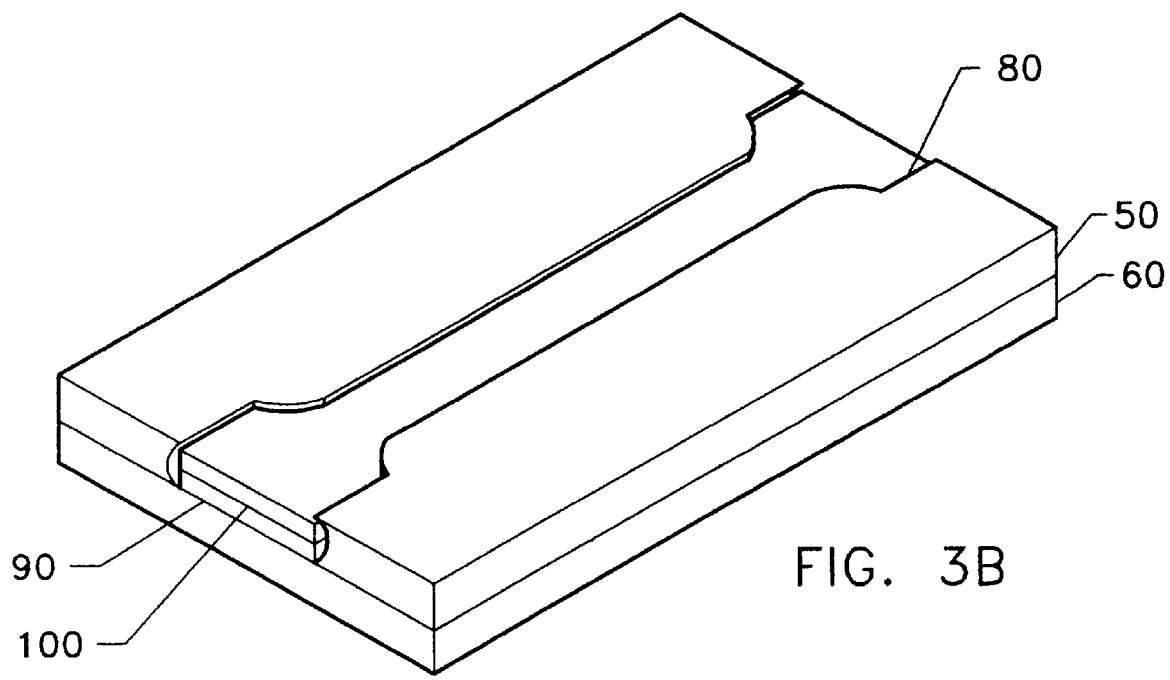
FIG. 3B is a drawing of the niobium and iridium layers of the sensor deposited through the copper layer.
Figure 3C:
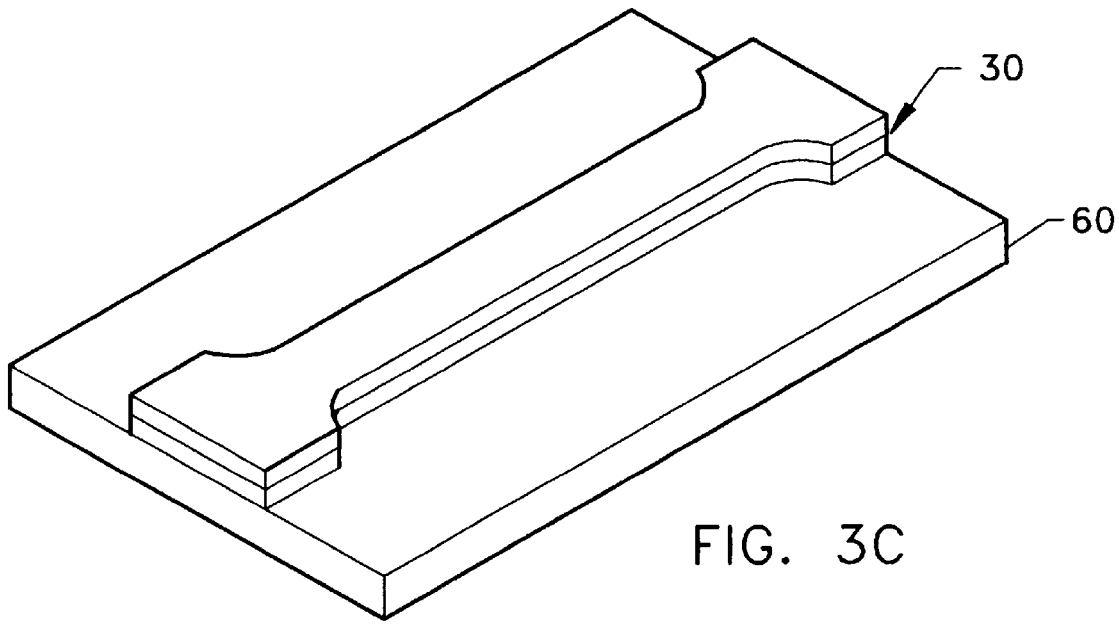
FIG. 3C is a drawing of the sensor formed on the sapphire substrate.

Referring to FIG. 1A, the probe 10 geometry consists of a straight portion leading to an approximately 14° half-wedge, ½ inch long×⅛ inch wide, diamond tooled out of a single crystal aluminum oxide (i.e., sapphire). The use of sapphire for the substrate material enables the probe to withstand severe temperatures without mechanical failure or a significant change in dielectric properties. The capability of sapphire to be machined and polished to a finish less than one micro-inch (r.m.s.) coupled with the microphotolithographic technique allows for a significant reduction in sensor size over existing hot-films, thus improving the spatial resolution of the probe. In addition, the substrate material was selected because it has a low thermal conductivity and a coefficient of thermal expansion that closely matches the iridium and niobium layers, thus reducing the risk of sensor detachment during thermal expansion. The 14° half-angle represents $\theta_{crit}$ for an air flow with a freestream Mach number slightly below 1.6, thus preventing the wedge from generating a detached shock through much of a hypersonic boundary layer. This angle can be modified for application to specific airflow conditions. The half-wedge geometry is preferred in order to minimize flow disturbance and allow for near-wall measurements in boundary layers. Referring to FIG. 1B, the bottom portion of the wedge is angled upward at 3° in an effort to relieve shock induced disturbances created by the finite curvature of the nose. This will lessen any boundary-layer disturbance that can propagate upstream, making for more accurate measurements. This angle of tilt can be modified to suit the application and different wedge tip radii. The wedge tip 20 is rounded to a radius of curvature of approximately 0.2 mm, and is then diamond polished to a r.m.s. surface finish of 1 microinch or less to prepare the surface for deposition of the sensor 30. The radius of curvature of the wedge tip 20 should be as small as possible to minimize flow disturbance while still accommodating the sensor. The rounded-nose, wedge tip geometry offers benefits over the "dual swept-surface" probes. Since the sensor is very narrow, "true" stagnation point heat-transfer will occur: existing heat transfer data for heated cylinders in turbulent cross-flow shows a negligible decrease in local Nusselt number for angles less than 5° from the stagnation line. It is thus possible to approximate the rounded nose as a cylinder in cross-flow, for which a considerable amount of data exists in all Mach number regimes. The onset of Mach number independence may also be reduced, as a normal shock will occur locally in front of the stagnation line, rather than a weaker oblique shock in front of a wedge.

A "dog-bone" shaped micro-sensor (approx. 2000 Å×12.5 μm×0.25 mm) 30 of iridium is deposited along the stagnation line 40 of the substrate using a microphotolithography technique, as described below. The "dog-bone" shape of the sensor results in reducing failures at the junction of the lead wire with the sensor because the "dog-bone" is wider at the ends so the actual junction doesn't become too hot. Additional turbulence measurements may be made from additional sensors located off the stagnation line.

To form the sensor 30, an approximately 4000–5000 Å thick layer of copper 50 is deposited by sputtering or vapor deposition onto the sensor area of the substrate 60. Although copper is preferred, other materials such as Cr, Ag and Ni can be used which can be selectively etched. A 2.0 μm thick layer of positive-phase photoresist 70 is then spun onto the copper layer 50 and baked. A negative of the "dog-bone" shaped sensor pattern is contact printed into the photoresist layer 70 by exposing the photoresist to ultraviolet light, preferably a highly collimated mercury-vapor light source. The photoresist is developed, leaving an opening 80 through to the copper layer 50 with a shape corresponding to the shape of the sensor. The copper is then etched with a suitable etchant such as ammonium phersulphate to produce an opening in the copper layer shaped like the sensor pattern. This opening extends to the sapphire substrate 60. The photoresist 70 is removed and a 150–200 Å thick layer of niobium 90 is then sputter deposited or vapor deposited onto the sapphire substrate 60 through the opening in the copper layer 50. Although niobium is preferred, other materials such as chromium can be used as long as the material selected is stable at high temperatures and is essentially nonreactive with adjacent layers. Deposition by electron beam vapor deposition is preferred because the vapor flux tends to be directional. The thickness of the niobium layer 90 can vary, but must be thick enough to provide an adhesive base and to ensure that the niobium is contiguous throughout the layer. Without breaking vacuum, an approximately 2000 Å layer of iridium 100 is deposited on the niobium layer 90 by sputtering or vapor deposition, although electron bean vapor deposition is preferred. The thickness of the iridium can be varied to produce a sensor having a desired resistance. Although iridium is preferred, other materials such as platinum can be used as long as the material selected is stable at high temperatures, has a reasonable thermal coefficient of resistance in the temperature range of interest, and is essentially nonreactive with the underlying layer. The copper layer 50 is removed with an etchant such as ammonium phersulphate and the substrate 60 containing the sensor 30 is annealed in a hard vacuum at approximately 1000° C.

to stabilize the resistance of the sensor. The hard vacuum is required because iridium slowly forms volatile oxides at temperatures above approximately 900° C.

The sensor 30 is then connected at each end to a corresponding lead 110 which is electrically connected to the driving circuit of the anemometer (not shown). Any suitable leads can be used as long as the leads do not protrude above the surface of the sapphire substrate enough to affect the airflow. For example, organometallic leads could be painted on, or the leads could be deposited by sputtering or vapor deposition in channels formed in the substrate. The leads can be any electrically conductive material having suitable resistance and stability at the operating temperature of the anemometer.

The microphotolithographic technique allows for a significant reduction in sensor size over previous designs, thus improving the spatial resolution of the probe. The thermal inertia of the sensor is two orders of magnitude smaller than that of a conventional 5.0 $\mu$m diameter hot wire and existing hot films. Therefore, a significant improvement in frequency response is expected. Preliminary results indicate a frequency response of 800 kHz via square-wave injection.

Although the present invention has been described in detail with respect to certain preferred embodiments thereof, it is understood by those of skill in the art that variations and modifications in this detail may be made without any departure from the spirit and scope of the present invention, as defined in the hereto-appended claims.

What is claimed is:

1. A method forming a thin-film probe, comprising the steps of:

providing a substrate of single crystal of aluminum oxide;

forming the substrate into a half-wedge shape having a tip with a radius of curvature less than 5 mm and a r.m.s. surface finish of not more than 1 microinch;

forming a thin-film sensor on the tip of the substrate, wherein the steps of forming the thin-film further comprises:

depositing a layer of copper on the curved tip of the substrate;

depositing a layer of positive-phase photoresist onto the copper layer;

drying the photoresist layer;

contact printing a negative of a sensor shape into the photoresist layer along the stagnation line of the tip of the substrate using ultraviolet light;

developing the photoresist to leave a sensor-shaped opening to the copper layer;

etching the copper layer to produce a corresponding sensor-shaped opening to the substrate;

removing the layer of photoresist;

depositing a layer of niobium onto the substrate through the sensor-shaped opening in the copper layer;

depositing a layer of iridium onto the niobium layer through the sensor-shaped opening in the copper layer;

removing the copper layer; and annealing the substrate having the thin-film sensor in a hard vacuum at approximately 1000° C. to stabilize the resistance of the thin-film sensor.

2. The method of claim 1, wherein the thickness of the copper layer is approximately 5000Å or less.

3. The method of claim 2, wherein the ultraviolet light is a highly collimated mercury-vapor light source.

4. The method of claim 3, wherein the niobium layer is approximately 200Å or less.

5. The method of claim 4, wherein the iridium layer is approximately 2000Å or less.

6. The method of claim 5, wherein the annealing temperature is approximately 1000° C. and the vacuum is at least approximately $10^{-5}$ Torr.

* * * * *